UNITED STATES PATENT OFFICE.

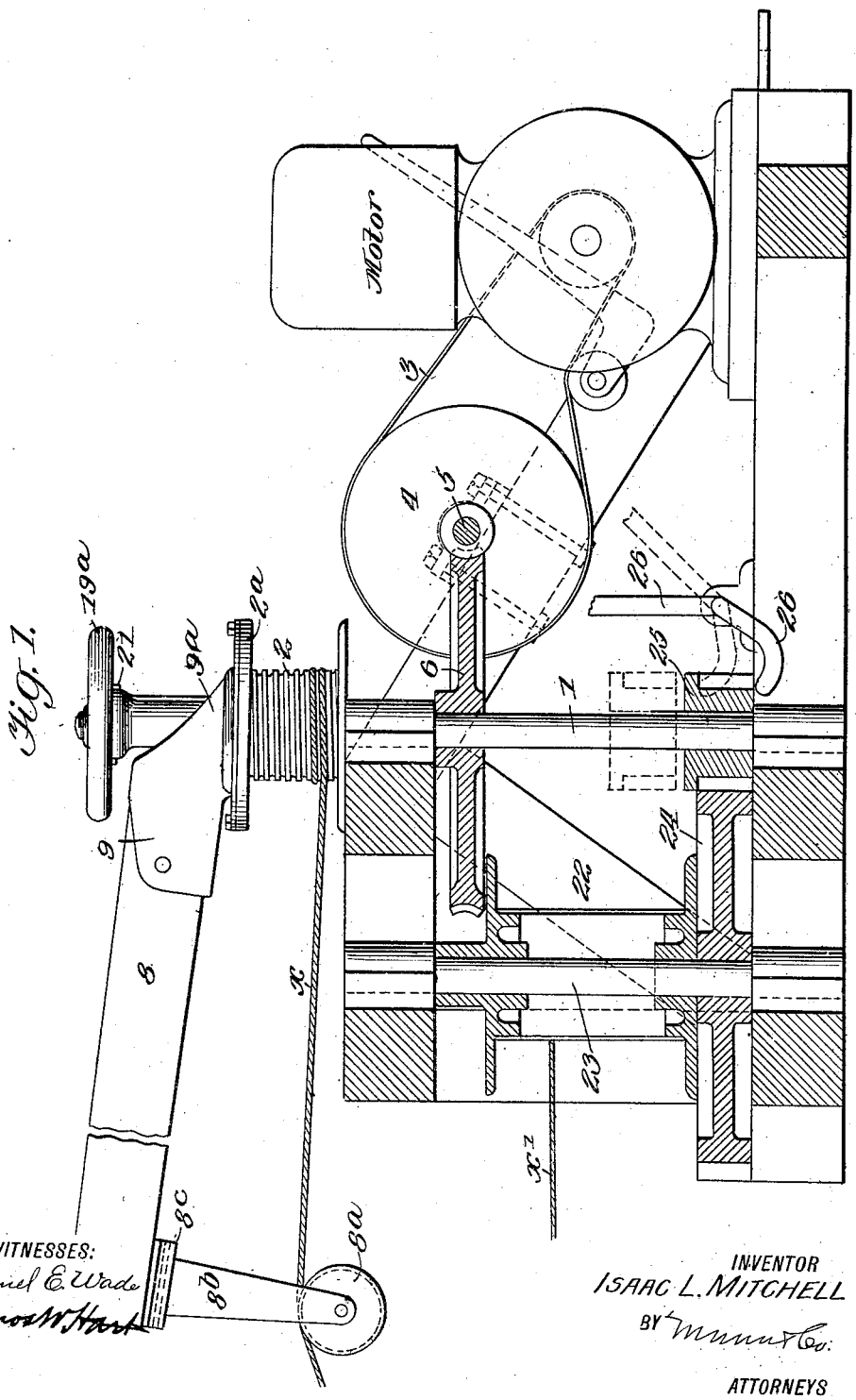

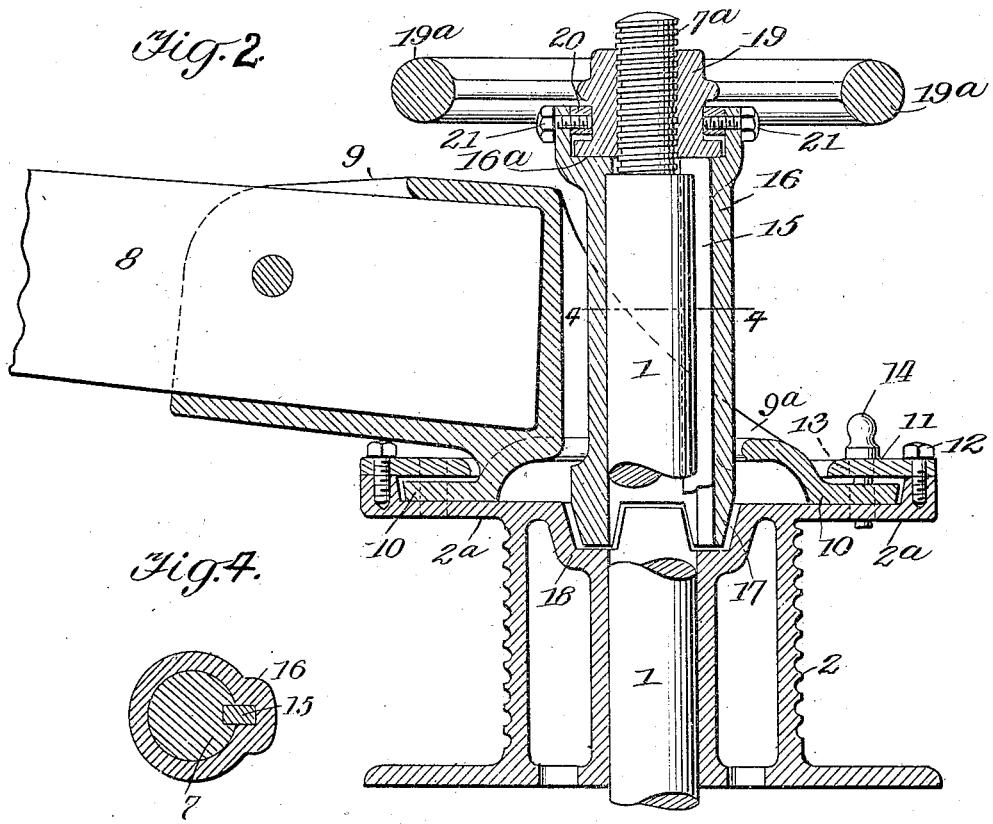

ISAAC LEMON MITCHELL, OF CEDAR RAPIDS, IOWA.

COMBINED STUMP-PULLER AND STUMP-PILER.

997,930.   Specification of Letters Patent.   Patented July 11, 1911.

Application filed September 19, 1910. Serial No. 582,650.

*To all whom it may concern:*

Be it known that I, ISAAC L. MITCHELL, a citizen of the United States, and a resident of Cedar Rapids, in the county of Linn and State of Iowa, have invented an Improved Combined Stump-Puller and Stump-Piler, of which the following is a specification.

Stump-pullers of a certain type are provided with a rotary drum on which is wound a chain or rope that in practice is extended and attached to stumps which it is desired to extract or remove. I have made certain improvements in such stump-pullers and I have combined therewith an attachment adapted for swinging the extracted stumps laterally out of the way and collecting or piling them in heaps.

The details of construction, arrangement, and operation of parts are as hereinafter set forth, and illustrated in the accompanying drawings, in which—

Figure 1 is in part a side elevation and in part a vertical section of the combined machine. Fig. 2 is a vertical section of the piler attachment. Fig. 3 is a plan view of the boom socket of the piler, together with the flanged rim of the winding drum forming part of the piler attachment. Fig. 4 is a cross section on line 4—4 of Fig. 2.

The piler attachment is mounted on the vertical driving shaft 1 of the stump-puller proper and the winding drum 2 of the piler is mounted loose on such shaft but is adapted to be locked therewith by means which will be presently described. Rotation is imparted to the driving shaft 1 from a motor or by hand power through the medium of a belt 3 running on a large pulley 4 that is keyed on a horizontal worm shaft 5, the same engaging a worm wheel 6 which is keyed on the driving shaft 1. The latter operates with puller and piler. The details of construction, arrangement, and operation of the piler attachment will now be described.

A wooden beam, termed a boom, 8 is secured in a metal socket 9, and, in practice, extends from the machine a considerable number of feet and is provided at its outer end with chains and grapples adapted for attachment to a stump. The boom 8 being arranged at a slight upward inclination from the inner to the outer end, it is evident that the latter will be a sufficent distance above the ground to enable the largest stump to be swung free.

In operation, the tackle having been connected with a stump, the boom is swung laterally and thus the stump is carried around to the right or left of the machine, and is then released. Thus, extracted stumps are successively collected or piled in heaps right or left from the stump-puller, thereby leaving the latter free to be advanced in a certain path or direction.

The socket 9 of the boom 8 is provided with a horizontal base flange 10 which is provided with a central opening and cast in one piece with the socket 9 and with side ribs 9$^a$ that extend down from the socket and join the side portions of the annular flange, as shown best in Fig. 6. The flange 10 rests on the top flange 2$^a$ of the drum 2 and is detachably secured thereto by means of an annular collar or rim 11 and screw bolts 12, as will be readily understood from the drawings.

The several parts 11, 10, and 2$^a$ are provided with vertical holes 13 to receive a pin 14 which serves to lock the boom socket 9—10 with the drum 2 when it is desired to operate the piler, or, in other words, to swing the boom laterally. In other words, the pin serves as a means for locking the boom and drum together, and it is obvious that in such case, the worm gear being set in operation, the drum will be wound whenever it is properly locked with the shaft 7. The means for effecting this are as follows: The shaft 1 is provided with a feather 15 and to this portion of the shaft is applied a vertically adjustable sleeve 16 which has a corresponding longitudinal groove for reception of the feather. The lower end of the sleeve is constructed as a clutch adapted to engage a corresponding clutch formed on the drum 2. In other words, the sleeve and drum are provided with half clutches which are adapted to engage when the sleeve is adjusted downward, so that its lower end 17 enters a socket 18 formed in the upper head of the drum. The parts are shown thus engaged in Fig. 2, and consequently the drum will be rotated with the shaft as may be required to wind on the rope or chain $x$, for pulling and extracting a stump. It will be understood that during such operation, the pin employed to lock the piler attachment to the drum will ordinarily be removed, so that the piler will be left neutral or at rest, although it is practicable to operate both the piler and stump-puller simultaneously.

The means for adjusting the clutch sleeve up and down on the feathered shaft and thus, engaging or disengaging the drum 2, are constructed as follows: The upper end of the shaft 1 is constructed as a reduced screw-threaded tenon to which a flanged nut 19 is applied, the same having a hand rim or wheel 19ª for convenience in rotating it. The base flange of such nut rests on a shoulder 16ª formed in the enlarged socketed head of the sleeve, and the nut is confined or secured detachably in such socket by means of a divided annular collar 20. Such collar is secured detachably to the head of the sleeve by means of lag screws 21. Thus, the collar 20 may be easily applied to or detached from the nut 19, and the latter may be in turn removed, together with its hand-wheel attachment, from the sleeve 16.

The rope or chain x of the stump-piler passes over a pulley 8ª which is journaled in a fork 8ᵇ having a circular head 8ᶜ that is rotatably connected with the boom 8 whose rotative attachment accommodates itself to the different angles at which the rope or chain x may extend while being attached to or dragging a stump.

In brief, it will be seen that the several parts of the piler may be all readily assembled and as easily detached from each other for the purpose of convenience of storage or transportation.

The piler forms a comparatively inexpensive attachment of the stump-puller and may be easily and quickly geared or connected therewith for operation, and, as before intimated, may be operated separately from, or simultaneously with, the stump-puller, as conditions may require.

22 indicates the winding drum of the stump-puller proper on which a chain or rope x' is wound, the same extending in practice far enough to adapt it for attachment in the proper manner to a stump that is to be extracted. Said drum 22 is keyed on a vertical shaft 23 having its bearings in the portable frame on which all the other parts of the apparatus including the motor are mounted. A large gear wheel 24 is keyed on the lower end of the shaft 23 and a pinion 25 is mounted on the driving shaft 1 and has a feather or spline connection with the same, but is adapted to be raised and lowered as indicated by dotted lines in Fig. 1.

When the pinion 25 is in the lower position indicated by full lines, it engages the gear 24 and consequently when the shaft 1 is driven, the drum 22 of the stump-puller will be rotated. On the other hand, when the pinion 25 is raised, as indicated by dotted lines in Fig. 1, out of engagement with the gear 24—which may be effected by means of a pivoted hand lever 26 or other device—it is apparent that the stump puller is thrown out of action; or, in other words, the winding drum is left at rest.

It will thus be seen that both the stump-puller and the piler attachment may be rigidly connected with the driving shaft 1, so that both may be operated simultaneously, or that either may be so connected with the shaft 1 that it may be driven or left at rest.

It will be seen that through the medium of the worm gear, the driving shaft 1 may be held locked when the motor is disconnected, and thus whatever tension has been applied to the ropes or chains of the stump-puller and stump-piler, may be retained. I thus dispense with the necessity of employing a pawl or other special locking device for either the stump-puller or piler.

What I claim is:—

1. The improved machine comprising a vertical driving shaft and means for rotating it, a rope-winding drum constituting part of a stump-piler, a device for detachably engaging said drum with the shaft, and a boom extending laterally from the shaft and adapted for suspending the rope of the piler drum, and means for locking the boom detachably with the drum, whereby the latter may be rotated to wind on the rope and then the boom locked with it for swinging or lifting a stump, substantially as described.

2. The improved machine comprising a vertical shaft and means for driving it, a stump-piler attachment consisting of a rope-winding drum mounted loose on the shaft, a device for locking it detachably with said shaft, a laterally extended boom, means for supporting the boom, the same formed of a socket having a circular base flange, and an annular inturned flange on the drum which receives the flange of said socket, and a device for locking the two flanges together as described, so that the drum may be rotated independently of, or together with, the boom, as the piling operation requires, as described.

ISAAC LEMON MITCHELL.

Witnesses:
 GENEVIEVE BUSIER,
 B. WHELAN.